April 28, 1953 J. D. LYALL 2,636,220
BALE BREAKER
Filed Oct. 7, 1947 4 Sheets-Sheet 1

Inventor
John D. Lyall
by
Walter + Kaufman
Attorney

April 28, 1953    J. D. LYALL    2,636,220
BALE BREAKER
Filed Oct. 7, 1947    4 Sheets-Sheet 3

Inventor
John D. Lyall
by
Walter F Kaufman
Attorney

Patented Apr. 28, 1953

2,636,220

UNITED STATES PATENT OFFICE 2,636,220

BALE BREAKER

John D. Lyall, Lancaster Township, Lancaster County, Pa., assignor to Armstrong Cork Company, Lancaster, Pa., a corporation of Pennsylvania Application October 7, 1947, Serial No. 778,328

7 Claims. (Cl. 19—80)

This invention relates to a bale breaker and, more particularly, to a device for picking apart bales of rags so that they can be used in subsequent manufacturing operations.

In the manufacture of felt from rags, it has been common practice to pick apart manually the bales of rags. This is a rather slow operation and also an undesirable one due to the dirty condition of the rags; consequently, it has been a bottleneck in the preparation of raw materials for the manufacture of felt from rags.

In order to overcome the disadvantages enumerated above, I have developed a device for mechanically picking apart the bales of rags, thereby doing away with the slow, unpleasant task of picking them apart by hand. With the device which I have developed, it is only necessary to have a limited number of men, two in most instances, to inspect the rags and remove foreign objects and unsuitable rags which are present in the bales. The purpose of the machine covered by this invention is merely to pick apart the bales of rags and not to shred the rags. The shredding operation is carried out on a different machine at a subsequent station in the processing line.

An object of this invention is to provide a machine for rapidly and effectively breaking down bales of rags preparatory to processing the rags for the production of rag felt or the like. Other objects and advantages will be obvious from the following description.

Figure 1:
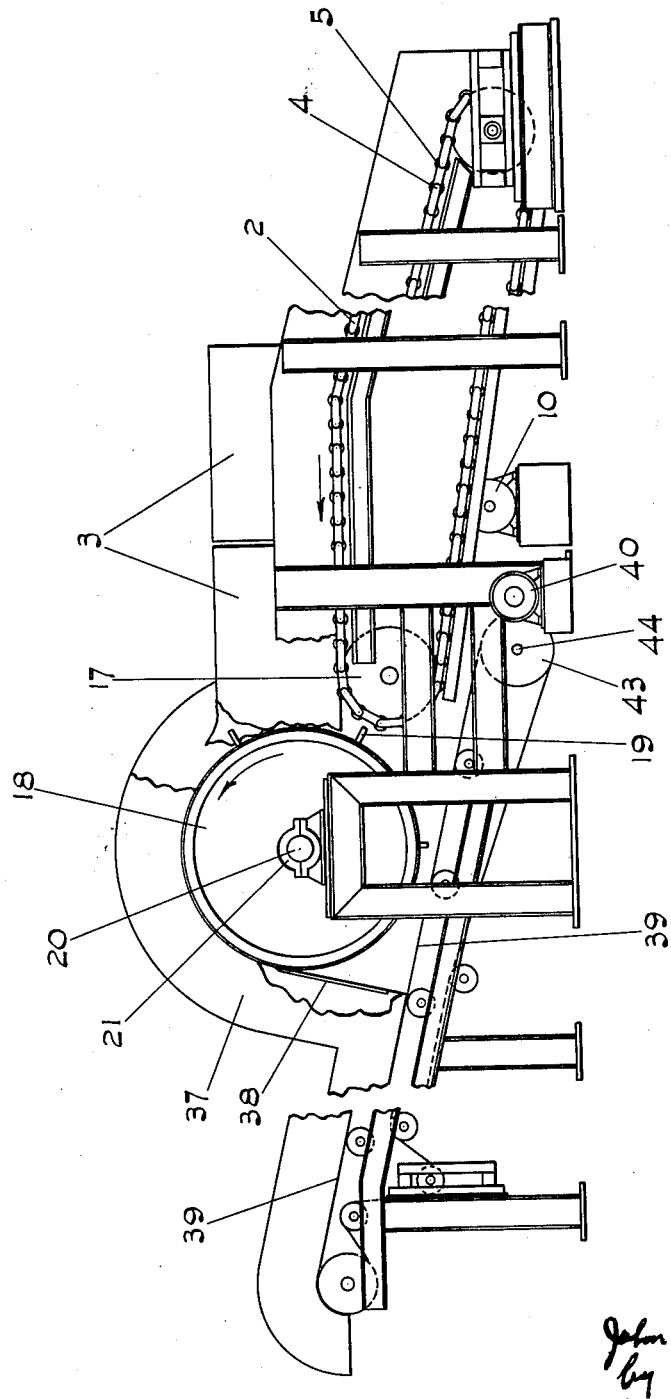
Figure 2:
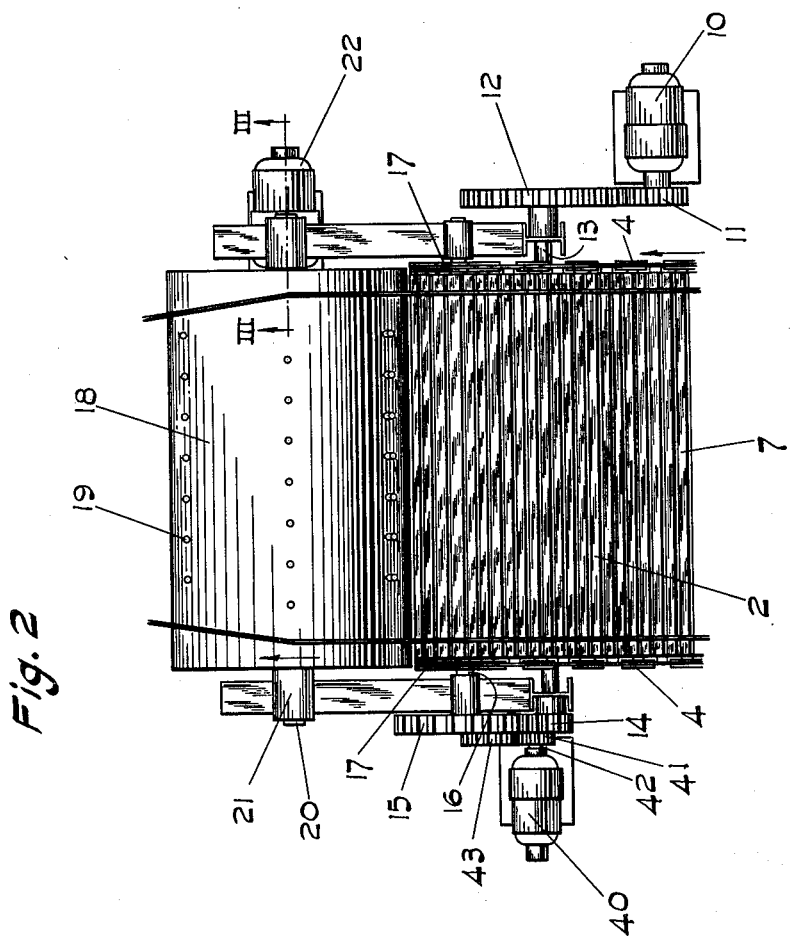
Figure 3:
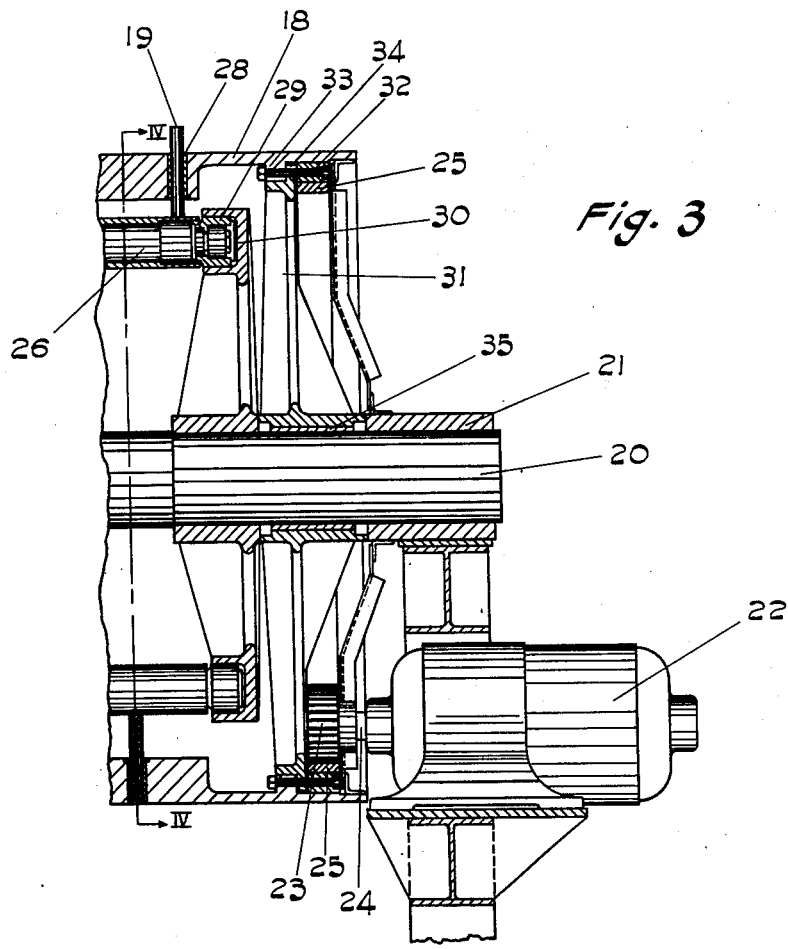
Figure 5:
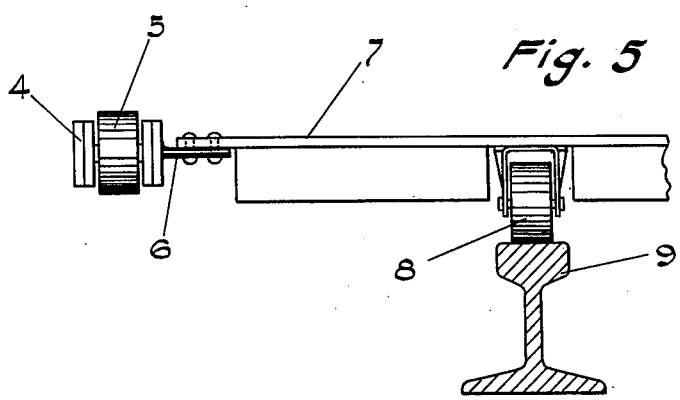
Figure 4:
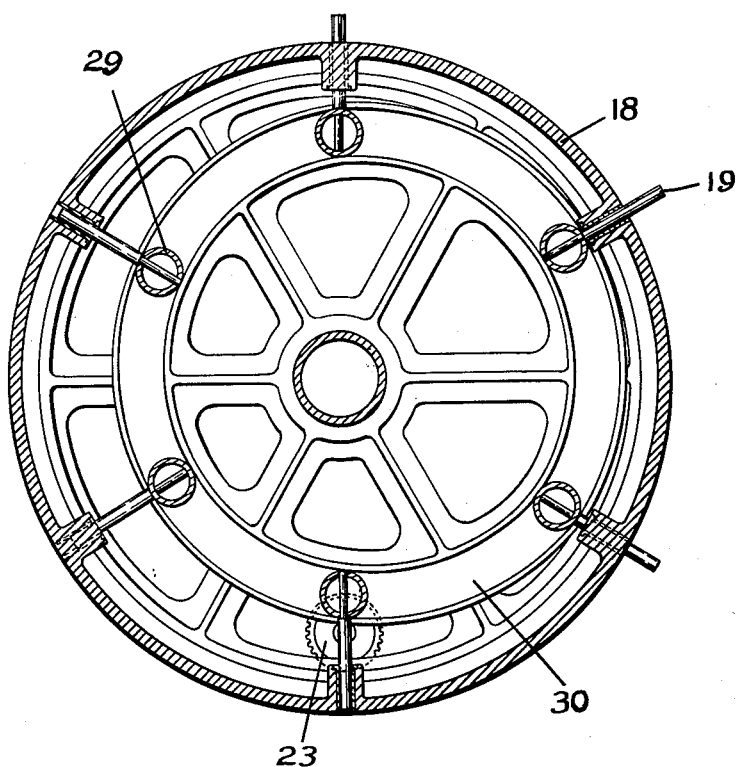

In order that my invention may be understood more readily, it will be described in connection with the attached drawings in which, Figure 1 is a side elevational view of the machine of my invention, Figure 2 is a top elevational view of the central section of my machine showing a picker roll carrying retractable pins, Figure 3 is a partial sectional view taken on the line III—III of Figure 2, Figure 4 is a sectional view taken on the line IV—IV of Figure 3, and Figure 5 is a detailed view of the conveyor construction.

Referring to Figure 1, there is shown a specially designed conveyor 2 suitable for carrying bales of rags 3 into a picker roll. The conveyor 2 is provided with a pair of side chains 4 having carrier rollers 5 and laterally extending projections 6 (Figure 5). The conveyor slats 7 are secured to the projections 6 by rivets or other means. The slats 7 are carried by wheels 8 which ride on the rails 9 and carry the conveyor load. The rollers 5 carry principally the weight of the chain 4. It will be noted that the slats 7 are positioned as close as possible to the center line of the rollers 5 in order to prevent the conveyor body formed of the slats 7 from unduly opening as the slats pass sequentially over the conveyor sprockets. In a conventional conveyor, the slats are positioned on the top of the chain so that as the slats pass over the sprockets, large gaps are formed between adjacent slats and rags would become entrapped, causing damage to the conveyor.

Referring now to Figure 2, the conveyor 2 is driven by a motor 10 through gear 11 which is in engagement with gear 12 affixed to a shaft 13. On the other end of shaft 13 is a pinion 14 which is in engagement with gear 15 affixed to shaft 16. The shaft 16 also carries two sprockets 17, one on either side of the machine. The sprockets 17 carry the chains 4 on either side of the conveyor. Inasmuch as this conveyor travels in the direction of the arrow, it will be obvious that the conveyor will carry the bales of rags into engagement with picker roll 18 positioned adjacent one end of the conveyor.

The picker roll 18 rotates in the direction of the arrow (Figure 1) and is provided with retractable pins 19 arranged in rows across the face of the picker roll as best shown in Figures 2 and 4. The picker roll 18 rotates about a fixed shaft 20 which is secured in clamps 21 on either side of the machine. Rotary motion is imparted to the picker roll 18 by means of a motor 22 (Figure 3) which has a pinion 23 affixed to the motor shaft 24. This pinion 23 operates in a ring gear 25 affixed to the inner circumference of the picker roll 18. The speed of the motor 22 and the ratio between the gears 23 and 25 is preferably such that the face of the picker roll 18 will be driven at a speed of approximately 55 feet per minute, although this may vary over a relatively wide range.

The picker roll 18 is provided with members 26 to which the retractable pins 19 are attached. These retractable pins 19 pass through bushings 28 which are affixed frictionally in the picker roll 18. At each end of the members 26 there are rollers 29 which operate in cam races 30 positioned at either end of the cylinder which are effective for retracting and extending the pins 19 during the rotation of the picker roll 18. In the particular embodiment here illustrated, the picker roll 18 is provided with six members 26. It will be noted from Figure 2 that the pins 19 on adjacent rows are staggered axially of the roll to increase the effectiveness of the picker roll when operating on a bale of rags.

The picker roll 18 is bolted to a spider 31 by bolts 32 which pass through an inwardly extending flange 33 provided on the inner circumference of the picker roll and an upstanding flange 34 on the spider 31. The spider 31 is mounted for rotation about the fixed shaft 20 in bearings 35. The ring gear 25 which is driven by motor 22 through pinion 23 is secured to the spider as shown in Figure 3.

The cam race 30 is fixed to the stationary shaft 20, and, therefore, it does not turn with the picker roll 18. The particular configuration of this cam race 30 is shown in Figure 4. It will be observed from a study of this figure that the cam race is not an eccentric circle within the cylinder but is designed in such manner that the pins are extended to their fullest extent during the entire period of time that the picker roll 18 is in operation upon the bale of rags to be picked apart. This obviates any motion of the pins in their bushings during the period when the pins are in engagement with the work load. This greatly reduces the wear on the pins and their bushings, particularly adjacent the outer ends of the bushings where the pins pass through.

In Figure 1 there is shown a flanged guard 37 provided on either side of the picker roll 18 to prevent rags from spilling over the sides of the cylinder. A doctor blade 38 is positioned for engagement with the surface of the picker roll 18, being located opposite the location at which the bales are fed to the picker roll. The cam race 30 is so positioned and contoured that the pins 19 will be completely retracted prior to passing under the doctor blade 38. The blade 38 serves to scrape the rags from the surface of the picker roll.

After the rags have been removed from the picker roll 18, they drop onto a conveyor 39 which leads away from the picker roll. This conveyor 39 is operated by a motor 40 through a pinion 41 (Figure 2) attached to the motor shaft 42. Pinion 41 is in engagement with a gear 43 carried by shaft 44. The shaft 44 also has sprockets keyed to it which engage chains which carry the conveyor 39.

The conveyor 39 is of the same general construction as the conveyor 2 described earlier in this specification. It will be noted that the conveyor 39 extends underneath the picker roll 18 and the upper end of the conveyor 2. This enables any small rags which are broken loose from the bales but are not engaged by the pins 19 to drop through the opening between the conveyor 2 on the picker roll 18 and fall onto the conveyor 39.

In the operation of my device, the large bales of rags designated by the numeral 3 are placed on the conveyor 2 which carries them to a point where they are in contact with the surface of the rotating picker roll 18. The pins 19 of the picker roll dig into the bale of rags and dislodge the rags from the bale. The rags which have been removed from the bale are held to the face of the picker roll by the pins 19 until the rags pass over the top of the picker, where the pins 19 are retracted and the rags fall by gravity onto the conveyor 39. Any rags which adhere to the picker roll are removed by the doctor blade 38 which contacts the surface of the picker roll at a point beyond that at which the pins are retracted. The conveyor 39 carries the rags past an inspection station where the rejected rags and foreign objects are removed and the remaining rags pass on to subsequent processing stations. Inasmuch as the conveyor 2 is operating continuously, it will be obvious that a pressure is exerted upon the bales in the direction of travel of the conveyor which forces the bales into contact with the picker roll 18. Other bales moving up the conveyor will aid in pressing the bale being operated upon firmly against the picker. This pressure is augmented by force applied by the pins which are moving in an upward direction, striking the bale, causing it to vibrate, and it is picked and shaken apart. During this operation, the larger rags, such as carpets and mattresses, are engaged by the pins and carried over the top of the cylinder while the smaller rags, such as shirt cuttings, etc., fall through the opening between the conveyor 2 and the picker roll 18 onto the conveyor 39.

It will be noted that in the machine here described, there is no possibility of clogging or choking due to the fact that it is so constructed, and the picker roll rotates in a direction so that the large loosened rags will be carried over the top of the picker roll where there are no obstructions to impede their passage.

It will be obvious from the above description that I have developed a bale breaker which will accomplish the task of breaking up bales of rags in a rapid and efficient manner, thereby eliminating the manual task which heretofore has been objectionable in the industry. Furthermore, I have developed a machine which may be operated continuously at a speed in excess of the speed with which these bales of rags can be picked apart manually, thereby removing a serious bottleneck in the manufacture of felt from rags.

While I have illustrated and described a preferred embodiment of my invention, it will be understood that the same is not so limited but may be otherwise practiced within the scope of the following claims.

I claim:

1. In a device for breaking apart bales of rags or the like, the combination comprising means for urging the bales into contact with a rotating picker roll, said rotating picker roll being provided with retractable pins which protrude into the bale and carry the rags in an unconfined path over the top of the picker roll, means for extending and retracting said pins, said pins being fully extended when contacting the bale, a doctor blade adapted to remove the rags from the picker roll at a point where the pins are retracted, and a conveyor for carrying the rags away from the picker roll, said conveyor being so arranged to receive the rags passing over the top of the picker roll and the rags removed from the picker roll by the doctor blade.

2. In a device for breaking apart bales of rags or the like, the combination comprising a conveyor for conveying the bales into engagement with a rotating picker roll, said rotating picker roll being provided with retractable pins, means for extending and retracting said pins, said pins being fully extended when contacting the bale, a doctor blade adapted to remove the rags from the picker roll at a point where the pins are retracted, and a conveyor for carrying the rags away from the picker roll, said conveyor being so arranged as to carry away the rags passing over the top of the picker roll and the rags removed from the picker roll by the doctor blade.

3. In a device for breaking apart bales of rags or the like, the combination comprising a conveyor for conveying bales into engagement with a rotating picker roll, said picker roll being provided with pins adapted to pick rags from the bales and carry the same through an unrestricted path over the top of the picker roll, said pins passing through bushings in the face of the picker roll and being attached to a rod located within the body of the picker roll, said rod having rollers attached to the ends thereof for engagement with a stationary cam race, said stationary cam race being of such geometrical configuration as to force the pins out for a certain portion of the cycle of rotation, said cam being so positioned as to force the pins outwardly at a point in the path of travel of the periphery of the picker roll while the picker roll is contacting the bale and withdrawing the pins at another point in the path of travel of the periphery of the picker roll, and a doctor blade contacting the picker roll at a point where the pins are retracted, said doctor blade being so positioned as to remove rags adhering to the surface of the picker roll so that the rags will fall away from the picker roll.

4. In a device for separating bales of rags and the like, the combination comprising a rotating picker roll carrying a series of rows of retractable pins disposed on the face thereof, said rows being parallel to the axis of the picker roll, each row of pins being attached to a rod disposed within the picker roll, said rods having rollers on their ends adapted to travel in a stationary cam race located at either end of the picker roll, said stationary cam race being of such geometrical configuration as to hold the pins in their extended position during a portion of the cycle of rotation of the picker roll and to hold them in their retracted position during a portion of the cycle of rotation of the picker roll, the actual withdrawing and extending of the pins being accomplished in a very limited portion of the cycle of rotation, means for conveying bales of rags to be urged into contact with the rotating picker roll at the point where the pins are extended so that the pins will remove rags from the bale and carry them in an unrestricted path over the top of the picker roll, means for conveying loose rags away from the picker roll, and a doctor blade for removing rags adhering to the roll in the zone where the pins are retracted, said doctor blade being so positioned that the rags removed thereby will fall onto the means for conveying the loose rags away from the picker roll.

5. A device for separating articles compressed in bales, the combination comprising a conveyor for conveying bales to a rotating picker roll provided with retractable pins and being disposed horizontally across the end of the conveyor a spaced distance from the conveyor, a second conveyor located beneath the rotating picker roll and the first-mentioned conveyor, said second conveyor being adapted to receive articles which pass over the picker roll as well as articles which pass through the opening between the picker roll and the first-mentioned conveyor, and a doctor blade positioned to engage the surface of the picker roll in such position that articles removed thereby will fall onto the conveyor for conveying articles away from the picker roll.

6. A device for separating articles compressed in bales, the elements comprising a continuously operating conveyor for feeding bales to a rotating picker roll provided with retractable pins, said pins engaging the bales to remove articles therefrom and carry them in an unrestricted path over the top of the picker roll, said picker roll being positioned horizontally across the end of the conveyor a spaced distance from the conveyor, a second conveyor located beneath the rotating picker roll and first-mentioned conveyor, said second conveyor being so positioned as to catch any articles passing over the rotating cylinder or any articles passing between the rotating picker roll and the first-mentioned conveyor, and a doctor blade for removing rags adhering to the surface of the picker roll and placing them on the conveyor moving away from the picker roll.

7. A device for separating articles compressed in bales, the combination comprising a conveyor for conveying bales to a rotating picker roll disposed horizontally across the end of the conveyor a spaced distance from the conveyor, said rotating picker roll being provided with retractable pins which are fully extended from the roll at a location along the path of the periphery of the picker roll adjacent the conveyor and fully retracted at a point along the path of travel of the periphery of the roll substantially diametrically opposite the location at which the pins are extended, a doctor blade adapted to contact the surface of the picker roll at a point where the pins are retracted, and a second conveyor adapted to receive articles which pass over the picker roll as well as articles which are removed by the doctor blade and articles which pass through the opening between the picker roll and the first-mentioned conveyor.

JOHN D. LYALL.

References Cited in the file of this patent

UNITED STATES PATENTS

| Number | Name | Date |
| --- | --- | --- |
| 586,778 | Marlow | July 20, 1897 |
| 668,907 | Delerue | Feb. 26, 1901 |
| 966,493 | Volk | Aug. 9, 1910 |
| 1,340,201 | Allen | May 18, 1920 |
| 2,533,218 | Brooks | Dec. 12, 1950 |

FOREIGN PATENTS

| Number | Country | Date |
| --- | --- | --- |
| 795 | Great Britain | of 1910 |